(12) United States Patent
Rausch et al.

(10) Patent No.: US 7,957,435 B2
(45) Date of Patent: Jun. 7, 2011

(54) ELECTRONICALLY CONTROLLED OPTICAL SCANNING

(75) Inventors: Christian Rausch, Unterhaching (DE); Florian Tauser, Glasgow (GB)

(73) Assignee: TOPTICA Photonics AG, Gräfelfing (DE)

( * ) Notice: Subject to any disclaimer, the term of this patent is extended or adjusted under 35 U.S.C. 154(b) by 25 days.

(21) Appl. No.: 12/286,826

(22) Filed: Oct. 2, 2008

(65) Prior Publication Data

US 2010/0002737 A1    Jan. 7, 2010

(30) Foreign Application Priority Data

Jul. 7, 2008   (DE) .................... 20 2008 009 021 U

(51) Int. Cl.
  H01S 3/10   (2006.01)
  H01S 3/13   (2006.01)
(52) U.S. Cl. ........................... 372/25; 372/30
(58) Field of Classification Search .............. 372/25, 372/28, 29.016, 29.023, 30
  See application file for complete search history.

(56) References Cited

U.S. PATENT DOCUMENTS 7,038,781 B2 * 5/2006 Pang et al. .................... 356/450

OTHER PUBLICATIONS

Elzinga et al, "Pump/probe method for fast analysis of visible spectral signatures utilizing asynchronous optical sampling," Applied Optics, Oct. 1, 1987, vol. 26, No. 19, pp. 4304-4309.

McFerran et al., "A passively mode-locked fiber laser at 1.54 μm with a fundamental repetition frequency reaching 2 Ghz," Optics Express, Oct. 1, 2007, vol. 15, No. 20, pp. 13155-13166.

Edelstein et al., "Rapid programmable 300 ps optical delay scanner and signal-averaging system for ultrafast measurements," American Institute of Physics, 1991, pp. 579-583.

Kwong et al., "400-Hz mechanical scanning optical delay line," Optics Letters, vol. 18, No. 7, Apr. 1, 1993, Optical Society of America, pp. 558-560.

Kafka et al., "Two-color subpicosecond optical sampling technique," Optics Letters, vol. 17, No. 18, Sep. 15, 1992, Optical Society of America, pp. 1286-1288.

Janke et al., "Asynchronous optical sampling for high-speed characterization of integrated resonant terahertz sensors," Optic Letters, Optical Society of America, Jun. 1, 2005, vol. 30, No. 11, pp. 1405-1407.

Miura et al., "Active synchronization of two mode-locked lasers with optical cross correlation," Applied Physics B, 75, 2002, pp. 19-23.

Sucha et al., "A New Method for Rapid Temporal Scanning of Ultrafast Lasers," IEEE Journal of Selected Topics in Quantam Electronics, vol. 2, No. 3, Sep. 1996, pp. 605-621.

* cited by examiner

*Primary Examiner* — Armando Rodriguez
(74) *Attorney, Agent, or Firm* — Collard & Roe, P.C.

(57) ABSTRACT

A device for generating light pulses that are separated in terms of time has a light source that emits a sequence of light pulses. A regulation signal is formed within a regulation circuit from a cycle signal and the light pulse sequence of the light sources via a phase detector. The regulation circuit includes a regulator that generates a setting signal that influences the repeat frequency of the light pulse sequence of the light source.

15 Claims, 2 Drawing Sheets

ELECTRONICALLY CONTROLLED OPTICAL SCANNING

CROSS-REFERENCE TO RELATED APPLICATIONS

Applicants claim priority under 35 U.S.C. §119 of German Application No. 20 2008 009 021.0 filed Jul. 7, 2008.

BACKGROUND OF THE INVENTION

1. Field of the Invention

The present invention relates to a device for generating light pulses that are separated in terms of time, having a light source that emits a sequence of light pulses.

2. The Prior Art

Such devices are used, for example, for ultra-fast time-resolved spectroscopy. In this connection, mode-coupled lasers are usually used as light sources. So-called pump-probe techniques are used for measuring and investigating the time progression of physical or chemical processes. Such techniques have led to significant advances in various scientific and technical sectors. Studies regarding relaxation dynamics in solids, liquids, and gases, time-resolved terahertz spectroscopy, and signal analysis in optical communications technology should be mentioned. Mode-coupled lasers are used as light pulse sources in synchrotron radiation sources in order to control the generation of electron bundles in terms of time. They are also used in order to analyze the time behavior of electron, UV-light, or X-ray pulses. All these applications have in common that it must be possible to precisely control the arrival times of the light pulses in an interaction center of the experiment, in each instance. In most cases, it must be possible to vary the arrival times, i.e. the time intervals between light pulses that arrive consecutively, in order to thereby be able to scan the time progression of the physical, technical, or chemical process to be studied.

It is known to generate consecutive light pulses having an adjustable time interval via a single light source. The light beam of the source is divided up into two partial beams and brought together again. A delay distance having a variable length is situated in one arm. In this method of procedure, the variable time interval between the light pulses results from the different running times in the arms of such an interferometer. The variable length is generally implemented by means of an electromechanically moved mirror. It is a disadvantage that the mirror movement is relatively slow, so that the time interval between the light pulses can be varied only in correspondingly slow manner. This requirement results in undesirably long scanning times. It is a further disadvantage that the mechanical mirror adjustment is susceptible to incorrect settings. Furthermore, the mirror movement brings about an undesirable variation in the beam diameter, caused by the divergence of the light beam.

To overcome the disadvantages indicated above, the so-called ASOPS technique ("asynchronous optical sampling") has become known. In this connection, two light sources are used, which emit periodic sequences of light pulses, whereby the light pulse sequences are superimposed in the interaction center of the experiment, in each instance. The light pulse sequences of the two light sources have a periodically varying time offset. This offset comes about because the repeat frequencies of the light pulse sequences of the two light sources are slightly different.

A significant disadvantage of the ASOPS technique is that light sources whose repeat frequencies amount to at least one gigahertz have to be used for generating the light pulses. Only in this way can a time resolution that is sufficient for most applications be achieved, at the same time with practicable scanning rates.

It is another disadvantage that the scanning range of the ASOPS technique is much too large for most practical applications. This large scanning range results from the principle that the time offset between consecutive light pulses always varies periodically between 0 and the full time interval between the light pulses of one of the light pulse sequences. If, for example, the repeat frequency of the light pulse sequences is 100 MHz, the time offset of the light pulse sequences automatically varies between 0 and 10 ns. A scanning range of 10 ns, however, is not needed in practice. For most applications, for example for time-resolve spectroscopy, a variable time offset of a few 10 ps is completely sufficient, because of the time scale of the dynamics being investigated. As a result, in the ASOPS technique, no useful measurement data can be obtained during the major portion of the measurement time (more than 90%).

SUMMARY OF THE INVENTION

Against this background, it is an object of the present invention to provide an improved device for generating light pulses that are separated in terms of time.

These and other objects are achieved, according to the invention, proceeding from a device of the type indicated initially, by forming a regulation signal within a regulation circuit from a cycle signal and the light pulse sequence of the light source, via a phase detector. The regulation circuit includes a regulator that generates a setting signal that influences the repeat frequency of the light pulse sequence of the light source.

According to the invention, the light source is coupled with a cycle signal source by way of a phase regulation loop. The cycle signal can be any desired periodic or aperiodic time signal, which is generated, for example, by means of a function generator. The cycle signal serves as a time-related reference signal. The current time offset between the light pulse sequence and the cycle signal is determined as a phase value by means of the phase detector. This phase value is utilized as a regulation signal within a regulation circuit. Leading or trailing of the light pulse sequence as compared with the cycle signal is generated, in targeted manner, by means of changing the repeat frequency. In this connection, the regulator adjusts the repeat frequency of the light pulse sequence of the light source in such a manner that the desired phase value, i.e. the desired time offset, is set.

According to a practical embodiment of the invention, the cycle signal is another light pulse sequence that is generated by another light source. In this case, the two light sources are connected with one another by way of the phase regulation loop, according to the invention, whereby the time offset between the two light pulse sequences is adjustable.

The device according to the invention has the advantage that the time offset between the light pulse sequences, i.e. between the cycle signal and the light pulse sequence, can be predetermined in almost any desired manner. The time resolution in varying the time offset is essentially determined only by the pulse widths of the light pulses and by the properties of the regulation circuit. The scanning range, i.e. the range over which the time offset is varied, for example in the case of a pump-probe experiment, can be pre-determined in any desired manner.

Thus, the technique according to the invention for generating light pulses that are separated in terms of time is superior to the conventional ASOPS technique both with regard to the time resolution and with regard to the adaptation of the scanning range to the requirements of the application, in each instance. In particular, the device according to the invention ensures that the entire measurement time can be utilized for generating useful measurement data. This entire measurement time can be used because the scanning range is not established on the basis of the principle of the ASOPS technique. Rather, the scanning range can be freely pre-determined.

According to a practical embodiment of the device according to the invention, the regulation circuit comprises an element for forming a regulation deviation signal from the regulation signal and a guide signal. The guide signal can be set on the user side, in order to pre-determine the desired phase difference, i.e. the desired time offset, between the light pulse sequences. The regulation deviation signal, which is formed from the regulation signal and the guide signal, is passed to the regulator. It is then practical if the regulator is configured in such a manner that the regulation deviation circuit is set by regulation to a fixed value, for example 0 volts, by means of corresponding variation of the setting signal.

It is practical if the element for forming the regulation deviation signal is an adder. This device adds the guide signal to the regulation signal. In this manner, the phase value to be set by regulation, i.e. the time offset between the light pulses to be set by regulation, can be pre-determined directly by way of the guide signal. The regulator, as explained above, ensures that the regulation deviation signal is set to a fixed value by regulation. Because the regulation deviation signal is the sum of the regulation signal and the guide signal, the guide signal determines the phase value, i.e. time offset that is actually set by regulation.

Fundamentally, the guide signal can be any desired time signal, if applicable also an aperiodic one. In accordance with a practical embodiment, however, the guide signal is a periodic signal. This periodic signal is generated by a function generator, for example. The amplitude and/or the frequency of the guide signal are adjustable. The scanning range is periodically scanned with regard to the time offset, by means of periodic variation of the guide signal. The width of the scanning range, i.e. the interval from minimal to maximal time offset, can be adjusted directly by means of the amplitude of the guide signal. The frequency of the guide signal determines the scanning speed. The guide signal can be a sine signal, for example, or also a triangular signal.

For most applications of devices of the type according to the invention, for example for fast time-resolved spectroscopy, a maximal time offset of the light pulse sequences of maximally 1 ns is sufficient. It is easily possible to set up the device according to the invention in such a manner that the time offset varies periodically and amounts to up to 1 ns. The time offset can also amount to clearly lower values of only a few 10 ps, so that the device according to the invention can be ideally adapted to the requirements of the application, in each instance. This adaptability particularly ensures that, as already explained above, useful measurement values can be obtained during the entire measurement time. For example, when using the device according to the invention for fast time-resolved spectroscopy, the scanning range can be precisely adapted to the time scale of the dynamic processes being investigated.

It is practical if a proportional-integral-derivative (PID) regulator is used as a regulator in the device according to the invention. The parameters of the PID regulator can be optimized in such a manner that the time offset of the light pulse sequences is precisely regulated by way of the adjustment of the repeat frequency. This optimization has a positive effect on the time resolution when using the device according to the invention for pump-probe experiments, for example. Experiments have shown that it is possible to achieve the result, by means of optimizing the regulation parameters, that the variations in time offset ("timing jitter") brought about by the regulation correspond only to approximately the pulse duration of the individual light pulses.

Mode-coupled lasers are suitable as light sources for the device according to the invention. In particular, the device according to the invention can be implemented, in advantageous manner, with fiber lasers. In experiments, fiber laser systems on the basis of erbium-doped fibers have proven themselves. Such mode-coupled fiber lasers, which emit light pulse sequences at repeat frequencies in the range of 100 MHz, are commercially available as pre-finished units, in advantageous manner. Such systems have proven themselves to be extremely robust. A significant advantage is that the device according to the invention, with mode-coupled fiber lasers as light sources, can be used for all the applications mentioned initially. Complicated, expensive, and furthermore adjustment-intensive titanium sapphire lasers, such as those usually used for ASOPS systems, are not necessary as light sources for the device according to the invention. The phase regulation of the device according to the invention ensures that for most applications, the requirements with regard to scanning frequency, scanning range, and also time resolution, can be fulfilled with mode-coupled fiber laser systems as light sources.

For practical implementation of the device according to the invention, the setting signal controlled by the regulator controls a mechanical setting element, via which the resonator length of the laser is adjusted. The resonator length directly influences the repeat frequency of the light pulse sequence. The setting element can be a commercially available piezotranslator, for example.

In a practical further embodiment of the invention, a cross-correlation signal is formed from the light pulse sequences by a correlator. In pump-probe experiments, for example, the cross-correlation signal can be used (in place of the cycle signal) to thereby trigger data recording. In this way, minor time shifts ("drifts") can be eliminated. Such drifts can occur if the optical path distances in the experiment, i.e. outside of the device according to the invention, unintentionally change, for example due to temperature variations. For example, the cross-correlation signal can be the pump-probe signal to be measured in the experiment, itself.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings.

DETAILED DESCRIPTION OF PREFERRED EMBODIMENTS

Figure 1:
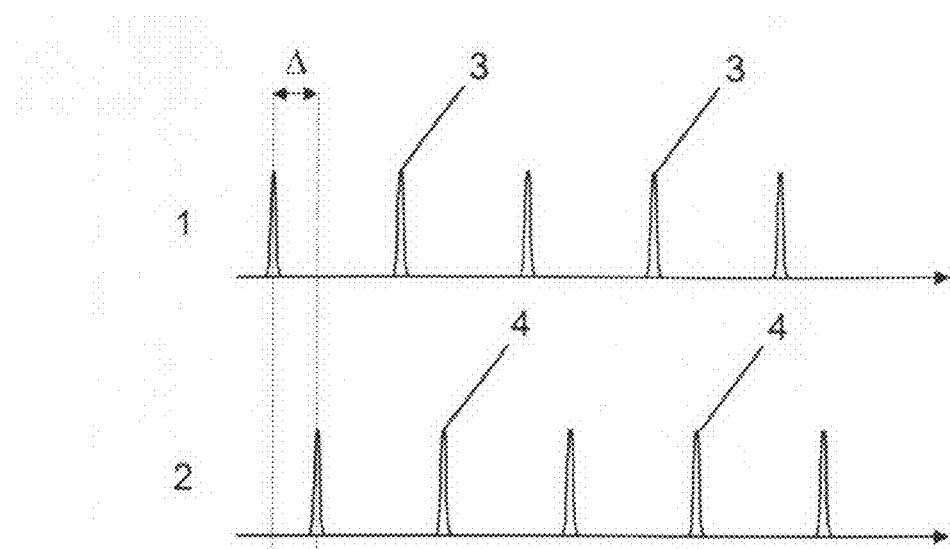
FIG. 1 is a schematic representation of light pulse sequences offset in terms of time.

Referring now in detail to the drawings, FIG. 1 schematically shows two light pulse sequences 1 and 2. Light pulse sequences 1 and 2 consist of a sequence of light pulses 3 and 4, respectively, in each instance, which are equidistant in terms of time. Light pulse sequences 1 and 2 have a time offset Δ. The duration of a single light pulse 3 or 4, respectively, amounts to 75 fs, for example. The repeat frequencies of light pulse sequences 1 and 2 lie in the range of 100 MHz, for example. Time offset Δ varies in the range of 0 to 1 ns in the case of typical applications of devices according to the invention. A lesser variation width (scanning range) of up to a few 10 p, however, is sufficient for most applications. Light pulse sequences 1 and 2 are spatially superimposed in the case of a typical application (e.g. pump-probe experiments) in an interaction center (e.g. a sample being examined).

Figure 2:
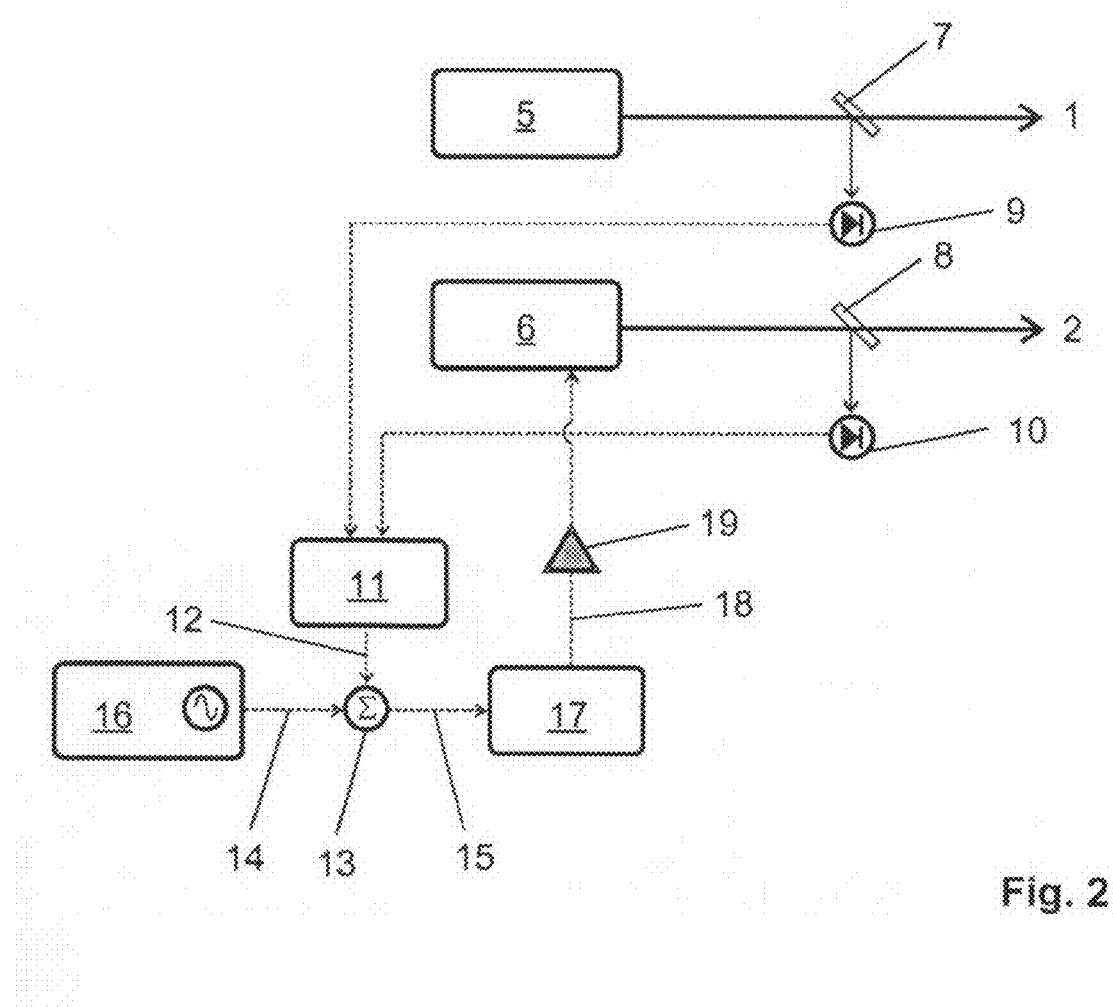
FIG. 2 is a block schematic representation of the device according to the invention.

FIG. 2 shows a device according to the invention, schematically, as a block schematic. The device comprises two mode-coupled femtosecond lasers 5 and 6 as light sources for generating light pulse sequences 1 and 2. For example, these light sources are fiber lasers on the basis of fibers doped with erbium ions as the active medium. A part of the laser light of light pulse sequences 1 and 2 is passed to photodiodes 9 and 10, respectively, by way of beam splitters 7 and 8. The photo streams generated by photodiodes 9 and 10 are passed to a phase detector 11. Phase detector 11 generates a regulation signal 12 at its output. An adder 13 is provided, which forms a regulation deviation signal 15 from regulation signal 12 and a guide signal 14. Guide signal 14 is generated by means of a function generator 16, whereby the amplitude and the frequency of guide signal 14 are adjustable. Regulation deviation signal 15 is present at the input of a PID regulator 17. PID regulator 17 generates a setting signal 18, which is amplified by means of an amplifier 19 and passed to light source 6. The setting signal acts on the repeat frequency of light pulse sequence 2 emitted by laser 6. For this purpose, the amplified setting signal 18 controls a piezo-translator integrated into laser 6, by means of which the resonator length of laser 6 is adjusted.

The frequency of guide signal 14 determines the scanning frequency of the device, i.e. the frequency at which the time offset Δ varies periodically. The amplitude of guide signal 14, which is freely adjustable by means of function generator 16, determines the width of the scanning range with regard to time offset Δ. It is possible to additionally carry out an offset correction by means of function generator 16. In this manner, the scanning range can be adjusted in such a manner that time offset Δ varies periodically between a minimal value that differs from 0, and a maximal value. In total, in this manner, "zooming" into a specific value range of time offset Δ can be implemented. Also, there is the possibility of synchronizing the variation of the guide signal with other signals of an experiment. This synchronization can be utilized, for example in the case of imaging measurements (for example in the case of confocal microscopy), to pass through the desired scanning range precisely once for every pixel.

Figure 3:
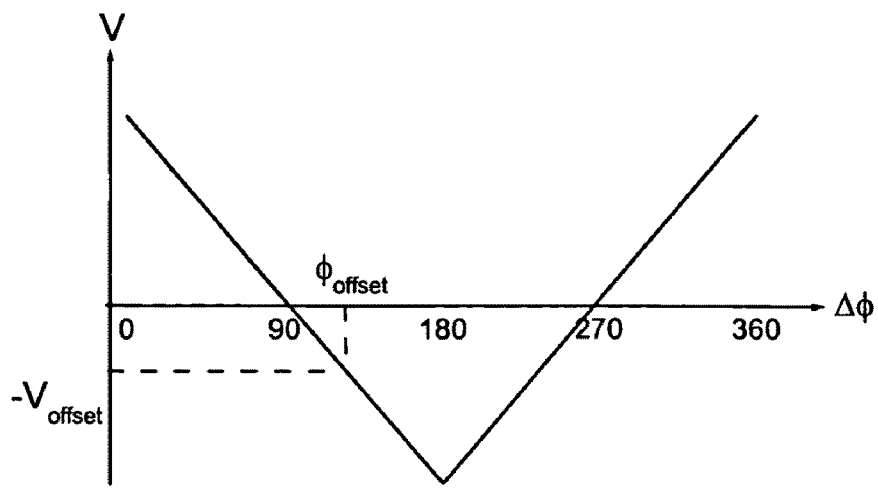
FIG. 3 shows an output signal (regulation signal) of the phase detector according to the invention.

FIG. 3 shows the regulation signal V, i.e. the output signal of phase detector 11, as a function of the relative phase position of the signals of photodiodes 9 and 10. $V_{offset}$ marks a specific value of guide signal 14 for illustration purposes. By adding $V_{offset}$ to regulation signal 12, the result is achieved that regulator 17 sets the phase value $\Phi_{offset}$ by means of adjusting it. The phase difference ΔΦ corresponds to a specific time offset Δ of light pulse sequences 1 and 2.

The diagram of FIG. 4a shows time offset Δ (in picoseconds) as a function of the time t in milliseconds. It can be seen from the diagram that the time offset is periodically varied between 0 ps and 400 ps, at a sequence of 50 Hz, specifically in accordance with a sine function (solid line) or a triangular function (broken line). The scanning frequency of time offset Δ, i.e. the frequency of guide signal 14, is 50 Hz in the case of the example shown.

The diagram of FIG. 4b illustrates the related adjustment L of the resonator length of laser 6 in nanometers. It can be seen that in accordance with the sine-shaped progression of time offset Δ, the resonator length is adjusted between −200 nm and 200 nm in sine shape. The rectangular adjustment of resonator length L (broken line) corresponds to the triangular progression of time offset Δ.

Figure 4:
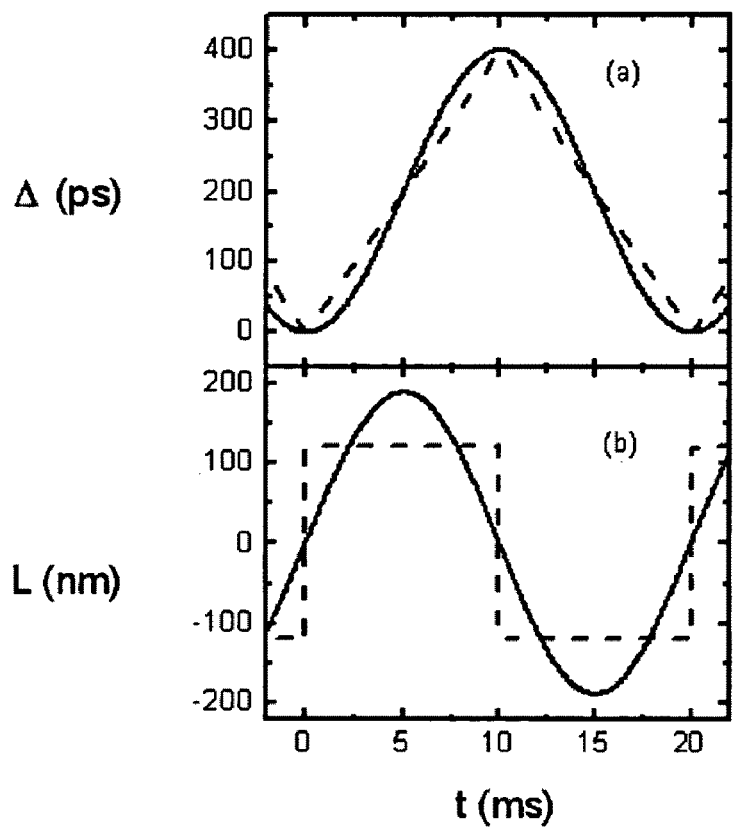
FIG. 4 shows time offset as a function of time (FIG. 4a) and resonator length of the laser light source as a function of time (FIG. 4b).

It is noteworthy, as can be seen in the diagrams of FIG. 4, that an adjustment of the resonator length by +/−200 nm is all that is required to vary the time offset by 400 ps. With a conventional interferometer, a mechanical length adjustment of an interferometer arm by more than 6 cm would have to take place in order to achieve a time offset of 400 ps. The adjustment path of 200 nm can be implemented in very robust manner, using a piezo setting element, with a short reaction time, at the same time.

Although only a few embodiments of the present invention have been shown and described, it is to be understood that many changes and modifications may be made thereunto without departing from the spirit and scope of the invention.

What is claimed is:

1. A device for generating time-separated light pulses comprising:
   (a) a first light source emitting a first light pulse sequence of light pulses at a repeat frequency;
   (b) a regulation circuit comprising a regulator generating a setting signal that influences the repeat frequency;
   (c) a cycle signal;
   (d) a phase detector; and
   (e) a regulation signal formed within the regulation circuit from the cycle signal and the first light pulse sequence via the phase detector;
   wherein the cycle signal is a second light pulse sequence that is generated via a second light source; and
   wherein the light pulse sequences of the first and second light sources have a periodically varying time offset of up to 1 ns.

2. The device according to claim 1, wherein the regulation circuit comprises an element for forming a regulation deviation signal from the regulation signal and a guide signal.

3. The device according to claim 2, wherein the element for forming the regulation deviation signal is an adder.

4. The device according to claim 2, wherein the guide signal is periodic and has an adjustable amplitude or an adjustable frequency.

5. The device according to claim 4, wherein the guide signal is a sine signal or a triangular signal.

6. The device according to claim 1, wherein the first and second light sources are mode-coupled lasers.

7. The device according to claim 6, wherein the first and second light sources are fiber lasers.

8. The device according to claim 6, wherein the setting signal controls a mechanical setting element for adjusting the resonator length of the first light source.

9. The device according to claim 8, wherein the setting element is a piezo-translator.

10. The device according to claim 1, wherein the light pulse sequences have repeating frequencies of up to 200 MHz.

11. The device according to claim 1, wherein the light pulses have a pulse duration of up to 1 ps.

12. The device according to claim 11, wherein the pulse duration is up to 200 fs.

13. The device according to claim 11, wherein the pulse duration is up to 100 fs.

14. The device according to claim 1, wherein a cross-correlation signal is formed from the light pulse sequences via a correlator.

15. A device for generating time-separated light pulses comprising:
(a) a first light source emitting a first light pulse sequence of light pulses at a repeat frequency;
(b) a regulation circuit comprising a regulator generating a setting signal that influences the repeat frequency;
(c) a cycle signal;
(d) a phase detector; and
(e) a regulation signal formed within the regulation circuit from the cycle signal and the first light pulse sequence via the phase detector;
wherein the regulator is a proportional-integral-derivative (PID) regulator.

* * * * *